(12) United States Patent
Kaminsky et al.

(10) Patent No.: US 11,578,545 B2
(45) Date of Patent: Feb. 14, 2023

(54) POLY REFRIGERATED INTEGRATED CYCLE OPERATION USING SOLID-TOLERANT HEAT EXCHANGERS

(71) Applicants: Robert D. Kaminsky, Houston, TX (US); Marcel Staedter, Houston, TX (US)

(72) Inventors: Robert D. Kaminsky, Houston, TX (US); Marcel Staedter, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 577 days.

(21) Appl. No.: 16/660,116

(22) Filed: Oct. 22, 2019

(65) Prior Publication Data

US 2020/0157895 A1 May 21, 2020

Related U.S. Application Data

(60) Provisional application No. 62/769,881, filed on Nov. 20, 2018.

(51) Int. Cl.

| | | |
|---|---|---|
| *B01D 21/34* | (2006.01) | |
| *E21B 21/06* | (2006.01) | |
| *B01D 53/00* | (2006.01) | |
| *B01D 53/26* | (2006.01) | |
| *C10L 3/10* | (2006.01) | |

(Continued)

(52) U.S. Cl.
CPC ............ *E21B 21/065* (2013.01); *B01D 21/34* (2013.01); *B01D 53/002* (2013.01); *B01D 53/265* (2013.01); *C10L 3/104* (2013.01); *C10L 3/106* (2013.01); *C10L 3/12* (2013.01); *F25J 1/0022* (2013.01); *F25J 1/0052* (2013.01);

(Continued)

(58) Field of Classification Search
None
See application file for complete search history.

(56) References Cited

U.S. PATENT DOCUMENTS

| 1,914,337 A | 6/1933 | Belt | |
|---|---|---|---|
| 1,974,145 A | 9/1934 | Atwell | ........................ 183/120 |

(Continued)

FOREIGN PATENT DOCUMENTS

| CN | 102620523 | 10/2014 | |
|---|---|---|---|
| CN | 102628635 | 10/2014 | ................. F25J 3/08 |

(Continued)

OTHER PUBLICATIONS

U.S. Appl. No. 62/458,127, filed Feb. 13, 2017, Pierre, Fritz Jr.

(Continued)

*Primary Examiner* — Tam M Nguyen
(74) *Attorney, Agent, or Firm* — ExxonMobil Upstream Research Company—Law Department

(57) ABSTRACT

Methods and systems for removing contaminants, such as water and/or carbon dioxide, from a gas stream, such as a natural gas stream or a flue gas stream. One or more solid-tolerant heat exchangers are employed to chill the gas stream to a temperature at which the contaminants solidify. The solidified contaminants may then be separated and removed from the gas stream. In one or more aspects, the one or more solid-tolerant heat exchangers may include a scraped heat exchanger.

20 Claims, 5 Drawing Sheets

(51) Int. Cl.
  *C10L 3/12* (2006.01)
  *F25J 1/00* (2006.01)
  *F25J 1/02* (2006.01)

(52) U.S. Cl.
  CPC ............ *F25J 1/0055* (2013.01); *F25J 1/0212* (2013.01); *F25J 1/0238* (2013.01); *B01D 2221/04* (2013.01)

(56) References Cited

U.S. PATENT DOCUMENTS

| | | | |
|---|---|---|---|
| 2,007,271 A | 7/1935 | Frankl | 62/175.5 |
| 2,011,550 A | 8/1935 | Hasche | 62/121 |
| 2,321,262 A | 6/1943 | Taylor | 62/140 |
| 2,475,255 A | 7/1949 | Rollman | 62/170 |
| 2,537,045 A | 1/1951 | Garbo | 62/122 |
| 3,014,082 A | 12/1961 | Woertz | 260/676 |
| 3,020,723 A * | 2/1962 | Young | F25J 3/029 62/612 |
| 3,103,427 A | 9/1963 | Jennings | 62/39 |
| 3,180,709 A | 4/1965 | Yendall et al. | 23/210 |
| 3,347,055 A | 10/1967 | Blanchard et al. | 62/9 |
| 3,370,435 A | 2/1968 | Arregger | 62/28 |
| 3,400,512 A | 9/1968 | McKay | 55/69 |
| 3,400,547 A | 9/1968 | Williams et al. | 62/55 |
| 3,511,058 A | 5/1970 | Becker | 62/9 |
| 3,581,511 A * | 6/1971 | Peck | F25J 1/0212 62/612 |
| 3,724,225 A | 4/1973 | Mancini et al. | |
| 3,724,226 A | 4/1973 | Pachaly | 62/39 |
| 3,878,689 A | 4/1975 | Grenci | 62/9 |
| 4,270,937 A * | 6/1981 | Adler | B01D 9/0059 62/922 |
| 4,281,518 A | 8/1981 | Muller et al. | 62/12 |
| 4,415,345 A | 11/1983 | Swallow | 62/28 |
| 4,609,388 A | 9/1986 | Adler et al. | 62/12 |
| 4,669,277 A | 6/1987 | Goldstein | |
| 4,769,054 A | 9/1988 | Steigman | 62/12 |
| 5,025,860 A | 6/1991 | Mandrin | 166/267 |
| 5,137,558 A | 8/1992 | Agrawal | 62/24 |
| 5,139,547 A | 8/1992 | Agrawal et al. | 62/8 |
| 5,141,543 A | 8/1992 | Agrawal et al. | 62/8 |
| 5,638,698 A | 6/1997 | Knight et al. | 62/632 |
| 5,657,643 A * | 8/1997 | Price | F25J 1/0092 62/623 |
| 5,950,453 A | 9/1999 | Bowen et al. | 62/612 |
| 6,003,603 A | 12/1999 | Breivik et al. | 166/357 |
| 6,082,133 A | 7/2000 | Barclay et al. | |
| 6,158,242 A | 12/2000 | Lu | 62/637 |
| 6,250,105 B1 * | 6/2001 | Kimble | F25J 1/0092 62/613 |
| 6,295,838 B1 | 10/2001 | Shah et al. | 62/643 |
| 6,298,688 B1 | 10/2001 | Brostow et al. | 62/613 |
| 6,412,302 B1 | 7/2002 | Foglietta | 62/611 |
| 6,662,589 B1 | 12/2003 | Roberts et al. | 62/425 |
| 6,889,522 B2 | 5/2005 | Prible et al. | 62/612 |
| 7,143,606 B2 | 12/2006 | Trainer | 62/611 |
| 7,219,512 B1 | 5/2007 | Wilding et al. | |
| 7,278,281 B2 | 10/2007 | Yang et al. | 62/612 |
| 7,386,996 B2 | 6/2008 | Fredheim et al. | 62/612 |
| 7,520,143 B2 | 4/2009 | Spilsbury | 62/620 |
| 7,712,331 B2 | 5/2010 | Dee et al. | 62/612 |
| 8,079,321 B2 | 12/2011 | Balasubramanian | 114/74 |
| 8,435,403 B2 | 5/2013 | Sapper et al. | 208/254 |
| 8,464,289 B2 | 6/2013 | Pan | 725/34 |
| 8,601,833 B2 | 12/2013 | Dee et al. | 62/648 |
| 8,616,012 B2 | 12/2013 | Duerr et al. | 62/89 |
| 8,747,520 B2 | 6/2014 | Bearden et al. | 95/41 |
| 9,016,088 B2 | 4/2015 | Butts | 62/613 |
| 9,339,752 B2 | 5/2016 | Reddy et al. | |
| 9,435,229 B2 | 9/2016 | Alekseev et al. | 60/643 |
| 9,439,077 B2 | 9/2016 | Gupta et al. | |
| 9,459,042 B2 | 10/2016 | Chantant et al. | 62/50.2 |
| 9,995,521 B2 | 6/2018 | Mogilevsky | |
| 10,294,433 B2 | 5/2019 | Grainger et al. | |
| 2003/0033827 A1 * | 2/2003 | Lu | B01D 53/265 62/317 |
| 2006/0000615 A1 | 1/2006 | Choi | 166/352 |
| 2007/0277674 A1 | 12/2007 | Hirano et al. | 95/290 |
| 2008/0087421 A1 | 4/2008 | Kaminsky | |
| 2008/0302133 A1 | 12/2008 | Saysset et al. | |
| 2009/0217701 A1 | 9/2009 | Minta et al. | 62/612 |
| 2010/0058803 A1 * | 3/2010 | Ransbarger | F25J 1/0052 62/612 |
| 2010/0192626 A1 | 8/2010 | Chantant | 62/606 |
| 2010/0251763 A1 | 10/2010 | Audun | 62/614 |
| 2011/0036121 A1 | 2/2011 | Roberts et al. | 62/612 |
| 2011/0126451 A1 | 6/2011 | Pan et al. | 44/451 |
| 2011/0259044 A1 | 10/2011 | Baudat et al. | 62/611 |
| 2012/0180657 A1 | 7/2012 | Monereau et al. | |
| 2012/0285196 A1 | 11/2012 | Flinn et al. | 62/620 |
| 2013/0074541 A1 | 3/2013 | Kaminsky et al. | 62/601 |
| 2013/0199238 A1 | 8/2013 | Mock et al. | 62/611 |
| 2014/0130542 A1 | 5/2014 | Brown et al. | 62/612 |
| 2015/0285553 A1 | 10/2015 | Oelfke et al. | 62/611 |
| 2017/0010041 A1 | 1/2017 | Pierre, Jr. et al. | 62/616 |
| 2017/0016667 A1 | 1/2017 | Huntington et al. | 62/614 |
| 2017/0016668 A1 | 1/2017 | Pierre, Jr. et al. | 62/614 |
| 2017/0122659 A1 * | 5/2017 | Gnanendran | F25J 3/0209 |
| 2017/0167785 A1 | 6/2017 | Pierre, Jr. et al. | 62/613 |
| 2017/0167786 A1 | 6/2017 | Pierre, Jr. | 62/613 |
| 2017/0167787 A1 | 6/2017 | Pierre, Jr. et al. | 62/614 |
| 2017/0167788 A1 | 6/2017 | Pierre, Jr. et al. | 62/620 |
| 2020/0158426 A1 * | 5/2020 | Kaminsky | F25J 1/0238 |
| 2021/0088275 A1 * | 3/2021 | Liu | F25J 1/0035 |

FOREIGN PATENT DOCUMENTS

| | | | |
|---|---|---|---|
| DE | 1960515 | 5/1971 | F25J 1/02 |
| DE | 2354726 | 5/1975 | F17C 9/04 |
| DE | 3149847 | 7/1983 | B01D 5/00 |
| DE | 3622145 | 1/1988 | |
| DE | 19906602 | 8/2000 | F25J 3/08 |
| DE | 102013007208 | 10/2014 | B01D 3/14 |
| EP | 1715267 | 10/2006 | F25J 3/02 |
| EP | 1972875 | 9/2008 | F25J 3/04 |
| EP | 2157013 | 8/2009 | F17C 3/02 |
| EP | 2629035 | 8/2013 | F25J 1/00 |
| FR | 2756368 | 5/1998 | B01D 53/26 |
| GB | 1376678 | 12/1974 | F25J 1/02 |
| GB | 1596330 | 8/1981 | F25J 1/02 |
| GB | 2172388 | 9/1986 | E21B 43/16 |
| GB | 2333148 | 7/1999 | F25J 1/02 |
| GB | 2470062 | 11/2010 | F25J 1/02 |
| GB | 2486036 | 11/2012 | F25J 1/02 |
| JP | 59216785 | 12/1984 | F25J 1/02 |
| JP | 2530859 | 4/1997 | G02F 1/13 |
| JP | 5705271 | 11/2013 | F25J 3/00 |
| JP | 5518531 | 6/2014 | Y02P 20/152 |
| KR | 2010/0112708 | 10/2010 | F17C 5/00 |
| KR | 2011/0079949 | 7/2011 | F25J 3/02 |
| WO | WO2006/120127 | 11/2006 | F25J 3/02 |
| WO | WO2008/133785 | 11/2008 | B63B 25/08 |
| WO | WO2011/101461 | 8/2011 | B63B 25/16 |
| WO | WO2012/031782 | 3/2012 | F25J 1/02 |
| WO | 2012/162690 | 11/2012 | |
| WO | WO2014/048845 | 4/2014 | F25J 1/00 |
| WO | WO2015/110443 | 7/2015 | F25J 1/00 |
| WO | 2016/060777 | 4/2016 | |
| WO | WO2017/011123 | 1/2017 | F25J 3/08 |
| WO | WO2017/067871 | 4/2017 | F01D 15/10 |

OTHER PUBLICATIONS

U.S. Appl. No. 62/458,131, filed Feb. 13, 2017, Pierre, Fritz Jr.
U.S. Appl. No. 62/463,274, filed Feb. 24, 2017, Kaminsky, Robert D. et al.
U.S. Appl. No. 62/478,961, Balasubramanian, Sathish.
Bach, Wilfried (1990) "Offshore Natural Gas Liquefaction with Nitrogen Cooling—Process Design and Comparison of Coil-Wound and Plate-Fin Heat Exchangers," *Science and Technology Reports*, No. 64, Jan. 1, 1990, pp. 31-37.

(56) References Cited

OTHER PUBLICATIONS

Chang, Ho-Myung et al., (2019) "Thermodynamic Design of Methane Liquefaction System Based on Reversed-Brayton Cycle" Cryogenics, pp. 226-234.
ConocoPhillips Liquefied Natural Gas Licensing (2017) "Our Technology And Expertise Are Ready To Work Toward Your LNG Future Today," http://lnglicensing.conocophillips.com/Documents/15-1106%20LNG%20Brochure_March2016.pdf, Apr. 25, 2017, 5 pgs.
Danish Technologies Institute (2017) "Project—Ice Bank System with Pulsating and Flexible Heat Exchanger (IPFLEX)," https://www.dti.dk/projects/project-ice-bank-system-with-pulsating-andflexible-heat-exchanger-ipflex/37176.
Diocee, T. S. et al. (2004) "Atlantic LNG Train 4—The Worlds Largest LNG Train", *The 14th International Conference and Exhibition on Liquefied Natural Gas (LNG 14)*, Doha, Qatar, Mar. 21-24, 2004, 15 pgs.
IceGen (2014) "Slurry Ice A Citrus Industry Revolution," *www.icegen.com*, Oct. 28-31, 2014, Parma, Italy, 13 pages.
Khoo, C. T. et al. (2009) "Execution of LNG Mega Trains—The Qatargas 2 Experience," *WCG*, 2009, 8 pages.
Laforte, C. et al. (2009) "Tensile, Torsional and Bending Strain at the Adhesive Rupture of an Iced Substrate," *ASME 28th Int'l Conf. on Ocean, Offshore and Arctic Eng.*, OMAE2009-79458, 8 pgs.
McLachlan, Greg (2002) "Efficient Operation of LNG From The Oman LNG Project," *Shell Global Solutions International B.V.*, Jan. 1, 2002, pp. 1-8.
Olsen, Lars et al. (2017).
Ott, C. M. et al. (2015) "Large LNG Trains: Technology Advances to Address Market Challenges", *Gastech*, Singapore, Oct. 27-30, 2015, 10 pgs.
Publication No. 43031 (2000) Research Disclosure, Mason Publications, Hampshire, GB, Feb. 1, 2000, p. 239, XP000969014, ISSN: 0374-4353, paragraphs [0004], [0005] & [0006].
Publication No. 37752 (1995) Research Disclosure, Mason Publications, Hampshire, GB, Sep. 1, 1995, p. 632, XP000536225, ISSN: 0374-4353, 1 page.
Ramshaw, Ian et al. (2009) "The Layout Challenges of Large Scale Floating LNG," *ConocoPhillips Global LNG Collaboration*, 2009, 24 pgs, XP009144486.
Riordan, Frank (1986) "A Deformable Heat Exchanger Separated by a Helicoid," *Journal of Physics A: Mathematical and General*, v. 19.9, pp. 1505-1515.
Roberts, M. J. et al. (2004) "Reducing LNG Capital Cost in Today's Competitive Environment", PS2-6, *The 14th International Conference and Exhibition on Liquefied Natural Gas (LNG 14)*, Doha, Qatar, Mar. 21-24, 2004, 12 pgs.
Shah, Pankaj et al. (2013) "Refrigeration Compressor Driver Selection and Technology Qualification Enhances Value for the Wheatstone Project," *17th Int'l Conf. & Exh. On LNG*, 27 pgs.
Tan, Hongbo et al. (2016) "Proposal and Design of a Natural Gas Liquefaction Process Recovering the Energy Obtained from the Pressure Reducing Stations of High-Pressure Pipelines," *Cryogenics*, Elsevier, Kidlington, GB, v.80, Sep. 22, 2016, pp. 82-90.
Tsang, T. P. et al. (2009) "Application of Novel Compressor/Driver Configuration in the Optimized Cascade Process," *2009 Spring Mtg. and Global Conf. on Process Safety—9th Topical Conf. on Gas Utilization*, 2009, Abstract, 1 pg. https://www.aiche.org/conferences/aiche-spring-meeting-and-globalcongress- on-process-safety/2009/proceeding/paper/7a-application-novel-compressordriver-configurationoptimized-cascader-process.

* cited by examiner

POLY REFRIGERATED INTEGRATED CYCLE OPERATION USING SOLID-TOLERANT HEAT EXCHANGERS

CROSS-REFERENCE TO RELATED APPLICATIONS

This application claims the priority benefit of U.S. Provisional Application No. 62/769,881, "Poly Refrigerated Integrated Cycle Operation using Solid-Tolerant Heat Exchangers," filed Nov. 20, 2018, the disclosures of which are incorporated by reference herein in their entireties for all purposes.

This application is related to U.S. Provisional Patent Application No. 62/769,886 filed Nov. 20, 2018, titled "Method for Using a Solid-Tolerant Heat Exchanger in Cryogenic Gas Treatment Processes", and U.S. Provisional Patent Application No. 62/769,890 filed Nov. 20, 2018, titled "Methods and Apparatus for Improving Multi-Plate Scraped Heat Exchangers", both of which are filed on an even date and have a common assignee herewith, the disclosures of which are incorporated by reference herein.

FIELD OF DISCLOSURE

The disclosure relates generally to gas processing. More specifically, the disclosure relates to the separation of impurities from a gas stream using one or more solid-tolerant heat exchangers.

DESCRIPTION OF RELATED ART

This section is intended to introduce various aspects of the art, which may be associated with the present disclosure. This discussion is intended to provide a framework to facilitate a better understanding of particular aspects of the present disclosure. Accordingly, it should be understood that this section should be read in this light, and not necessarily as admissions of prior art.

Cryogenic treatment of gaseous feeds (e.g., to form LNG or separate $CO_2$ from flue gas) typically requires significant pre-treatment to remove water, $CO_2$, and/or other components (e.g., BTEX's, mercury, waxes) so they do not foul the heat exchangers. Heat exchanger fouling during the cryogenic process may be the result of solid $CO_2$ and water accumulation on the heat exchanger surface, i.e., ice formation in passages. This will cause maldistribution of process fluids in parallel path heat exchangers, increases pressure drop and severe temperature gradients as a result of maldistribution. Ultimately, heat transfer performance will be compromised, process flow may seize and the heat exchanger may experience mechanical failure as a result of severe thermal gradients and ice expansion during freezing.

Solid-tolerant heat exchangers have been used in various industries, e.g., food processing to manage accumulation of solids on heat exchanger surfaces. This allows for continuous operation of the process while maintaining acceptable pressure drop and heat transfer performance Despite the application of solid-tolerant heat exchangers in various industries including for the gas treating processes, their application has not been commercially appealing for the integration within a cryogenic cooling cycle for an LNG or $CO_2$ capture process. What is needed is a compact heat exchanger that can be used in gas processing methods.

SUMMARY

The present disclosure provides a method for removing water and carbon dioxide from a feed gas stream containing water and carbon dioxide. A first treated gas stream is produced by feeding the feed gas stream to a first solid-tolerant heat exchanger. The first solid-tolerant heat exchanger chills the feed gas stream to a first temperature. A second treated gas stream is produced by feeding the first treated gas stream to a second solid-tolerant heat exchanger. The second solid-tolerant heat exchanger chills the first treated gas stream to a second temperature.

The disclosure also provides a method of removing solid-forming components from a gaseous process stream. A refrigerant stream is compressed and then cooled by heat exchange with an ambient cool fluid. The refrigerant stream is passed through a non-solid-tolerant heat exchanger. The refrigerant stream is expanded, thereby causing it to cool. The refrigerant stream is separated into a first refrigerant stream and second refrigerant stream. The first refrigerant stream is passed through the non-solid-tolerant heat exchanger to cool the refrigerant stream. The second refrigerant stream is passed through a solid-tolerant heat exchanger. A cooled treated stream is formed by passing the process stream through the solid-tolerant heat exchanger to be cooled by the second refrigerant stream, wherein the cooling is sufficient to cause solid-forming components in the process stream to solidify. The solidified solid-forming components are separated from the process stream. The first and second refrigerant streams are re-combined to form the refrigerant stream.

The foregoing has broadly outlined the features of the present disclosure in order that the detailed description that follows may be better understood. Additional features will also be described herein.

BRIEF DESCRIPTION OF THE DRAWINGS

These and other features, aspects and advantages of the disclosure will become apparent from the following description, appending claims and the accompanying drawings, which are briefly described below.

Figure 1:
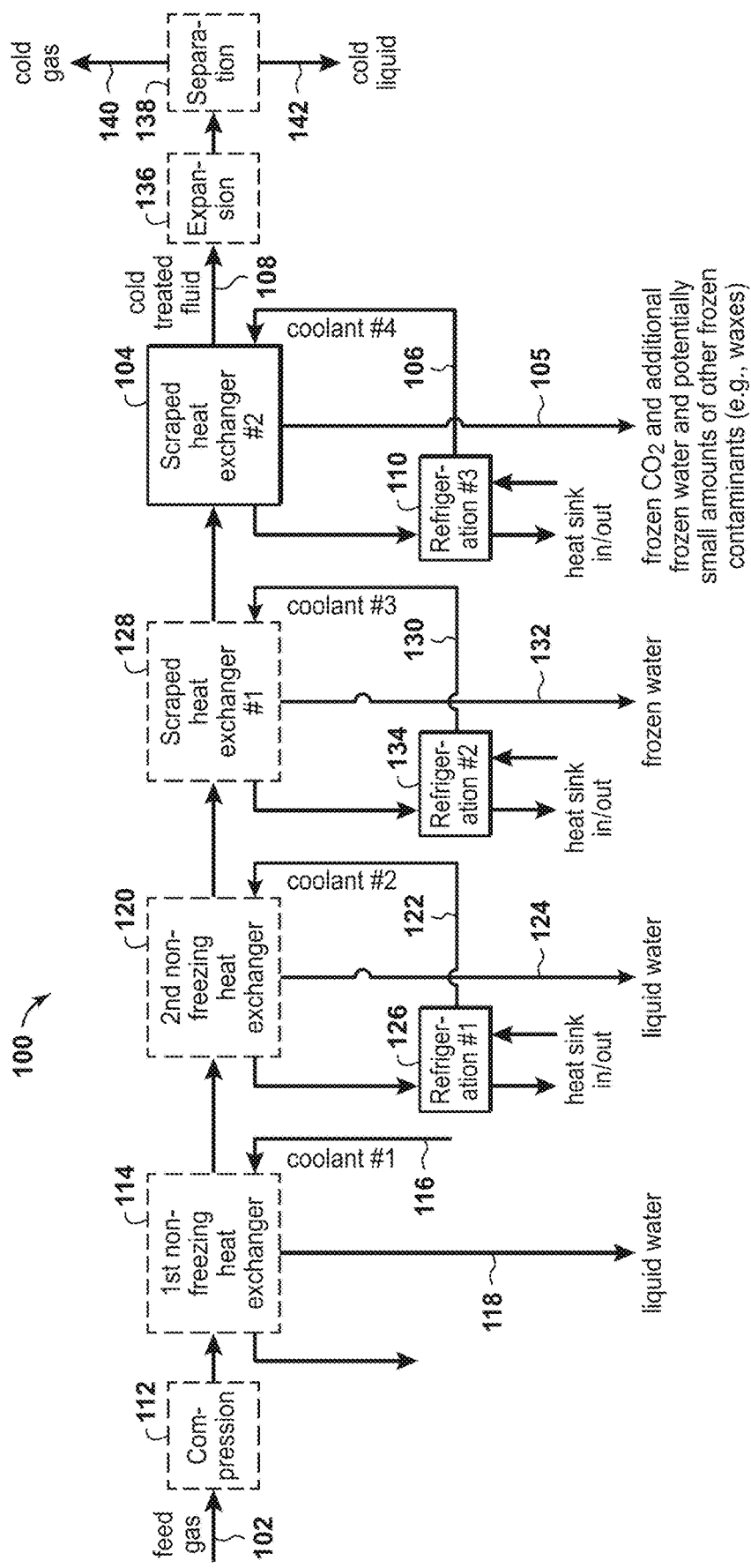
FIG. 1 is a schematic diagram of a process according to an aspect of the disclosure.

It should be noted that the figures are merely examples and no limitations on the scope of the present disclosure are intended thereby. Further, the figures are generally not drawn to scale, but are drafted for purposes of convenience and clarity in illustrating various aspects of the disclosure.

DETAILED DESCRIPTION

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

According to aspects of the disclosure, a solid-tolerant heat exchanger is integrated into cryogenic cooling processes to accommodate gas that is minimally treated, i.e., still containing significant amounts of water and carbon dioxide ($CO_2$). The solid-tolerant heat exchanger is a heat exchanger which is designed to maintain acceptable performance despite the formation of frozen solids at its operating temperatures. Conversely, a non-solid-tolerant heat exchanger is a heat exchanger which is not designed with the expectation of solids freezing out within it—e.g., a conventional shell-and-tube or plate heat exchanger. The solid-tolerant heat exchanger may be a scraped heat exchanger, which include heat exchangers with scraped surfaces using simple mechanical scrapers (e.g., fixed blades sliding over surfaces) and/or using dynamic mechanical scrapers, such as the rotating blades found, for example, in U.S. Pat. No. 3,403,532, the disclosure of which is incorporated herein by reference. Other types of solid-tolerant heat exchangers include but are not limited to fluidized bed heat exchangers and reversing heat exchangers. Some solid-tolerant heat exchangers may employ low adhesion coatings or surface treatments to reduce the impact of solids formation on performance By using a solid-tolerant heat exchanger, solid forming components in the gas feed are simultaneously separated from the gas as it is cryogenically cooled.

FIG. 1 is a schematic diagram depicting a process 100 using one or more solid-tolerant heat exchangers according to an aspect of the disclosure. Process 100 may be used to capture $CO_2$ from flue gas. Process 100 may be used to generate liquefied natural gas (LNG) from a feed gas stream 102 that is contaminated with $CO_2$ and/or water. At its most basic design, the feed gas stream 102 is fed into a solid-tolerant heat exchanger, which in FIG. 1 is shown as a second scraped heat exchanger 104. While known scraped heat exchanger designs may be suitable for such use, it is probable that known designs (which have generally focused on liquid feeds and temperatures warmer than the deep cryogenic temperatures associated with LNG or $CO_2$ freeze-out) would need to be modified for effective use with feed gas stream 102. Such modifications may include those disclosed in co-pending U.S. patent application "Methods and Apparatus for Improving Multi-Plate Scraped Heat Exchangers," filed on an even date herewith and incorporated by reference herein. Second scraped heat exchanger 104 facilitates the cooling of feed gas stream 102 using a fourth coolant 106. The fourth coolant 106 may be primarily ethane, primarily ethylene, primarily methane, primarily nitrogen, or may comprise any one of known types of single mixed refrigerants (SMR), i.e., a mixture of two or more refrigerant species chosen to provide a desired cooling energy versus temperature behavior. The feed gas stream 102 is cooled to a temperature sufficient for contaminants, such as water, $CO_2$, potentially small amounts of other contaminants such as waxes, or the like, to solidify and separate from the feed gas stream as a solids stream 105. The feed gas stream exits the second scraped heat exchanger 104 as a cold treated fluid 108. The fourth coolant 106 is directed to a third refrigeration unit 110 that chills the fourth coolant before it is recycled to the second scraped heat exchanger.

FIG. 1 depicts further process steps that may be used to more efficiently treat the feed gas stream using a combination of non-freezing heat exchangers and solid-tolerant heat exchangers. A non-freezing heat exchanger is a heat exchanger which operates at temperatures above which any freeze-out of species occurs. For example, the feed gas stream 102 may be compressed using a compressor 112 and passed through a first non-freezing heat exchanger 114, which may use ambient air or water as a first refrigerant or coolant 116 to cool the compressed feed gas stream and remove liquid water 118 therefrom. The cooled compressed feed gas stream may then pass through a second non-freezing heat exchanger 120, which may use a second refrigerant or coolant 122, which may comprise primarily propane, to additionally cool the cooled compressed feed gas stream and remove liquid water 124 therefrom. The second coolant 122 may be directed to a first refrigeration unit 126 that cools the second coolant to be recycled to the second non-freezing heat exchanger 120. The additionally cooled compressed feed gas stream may pass through a solid-tolerant heat exchanger, which in FIG. 1 is shown as a first scraped heat exchanger 128. First scraped heat exchanger 128 may have a structure similar to the second scraped heat exchanger 104 previously described. First scraped heat exchanger 128 facilitates the cooling of the additionally cooled compressed feed gas stream using a third refrigerant or coolant 130. The third coolant 130 may be primarily propane. The additionally cooled compressed feed gas stream is cooled to a temperature sufficient for water to solidify and separate therefrom at 132. The third coolant 130 is directed to a second refrigeration unit 134 that chills the third coolant before it is recycled to the first scraped heat exchanger. The additionally cooled compressed feed gas stream exits the first scraped heat exchanger 128 and is passed through the second scraped heat exchanger 104 as previously described. The cold treated fluid 108 exiting the second scraped heat exchanger 104 may be expanded in an expander 136 to liquefy or further cool the cold treated fluid. A separator 138 may then separate the cold treated fluid into a cold gas stream 140 and a cold liquid stream 142, which in some aspects may comprise an LNG stream. The cold gas stream 140 may be vented, used or sold as a product, used as fuel to drive compressors or other machinery in process 100 or elsewhere, used at least in part as one of the second through the fourth coolants, or used at least in part as an additional coolant that cools one of the second through fourth coolants within the first through third refrigeration systems.

Figure 2:
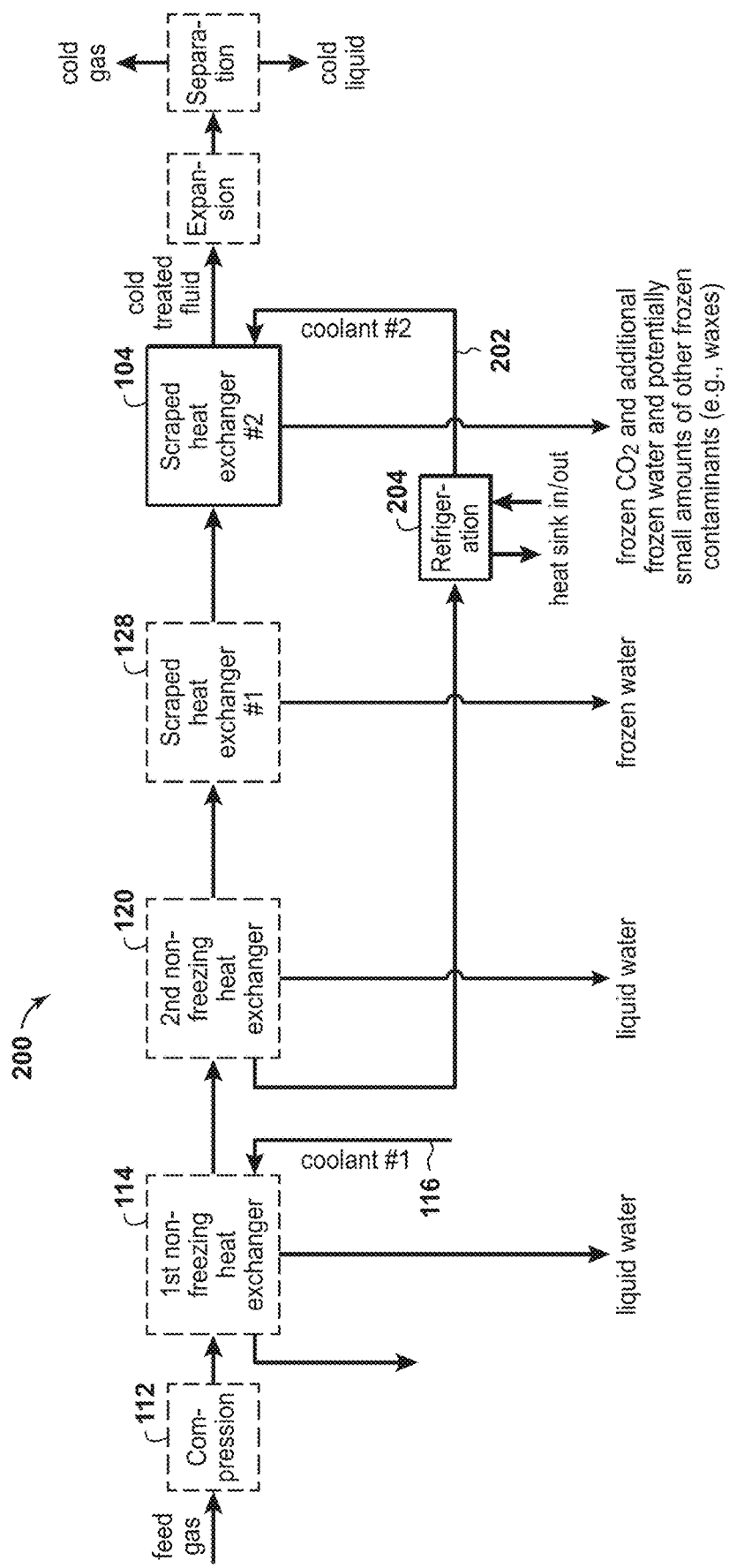
FIG. 2 is a schematic diagram of a process according to another aspect of the disclosure.

FIG. 2 is a schematic depicting a process 200 using one or more solid-tolerant heat exchangers according to further aspects of the disclosure. Process 200 is similar to process 100, and elements with previously described reference numbers will not be additionally described. In process 200, a first coolant 116 is used with first non-freezing heat exchanger 114 as previously described, and a single refrigerant circuit employs a second coolant 202 to cool, in order, the second scraped heat exchanger 104, first scraped heat exchanger 128, and second non-freezing heat exchanger 120. After exiting the second non-freezing heat exchanger 120, the second coolant 202 is cooled in a refrigeration unit 204 and then directed back to the second scraped heat exchanger 104. The second coolant 202 is a non-ambient temperature coolant, or in other words, the second coolant is not ambient air or ambient water. In an aspect, the second coolant 202 may comprise a hydrocarbon fluid, a halogenated hydrocarbon fluid, or ammonia.

Figure 3:
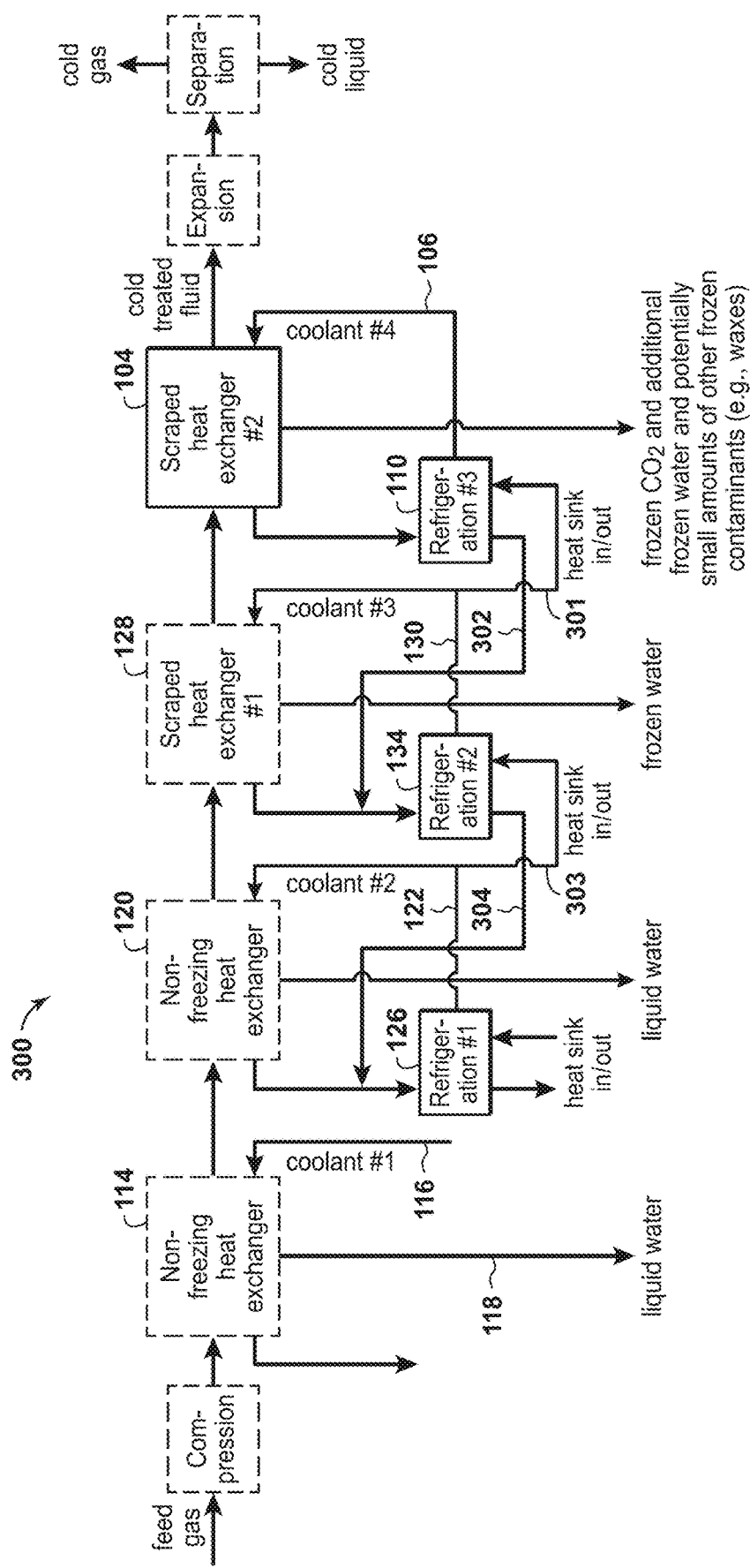
FIG. 3 is a schematic diagram of a process according to further aspects of the disclosure.

FIG. 3 is a schematic depicting a process 300 using one or more solid-tolerant heat exchangers according to further aspects of the disclosure. Process 300 is similar to processes 100, and elements with previously described reference numbers will not be additionally described. In process 300 portions of each of the second and third coolants 122, 130 are used as a refrigeration source and/or heat sink to cool the third and fourth coolants in the second and third refrigeration units 134, 110, respectively. Specifically, a first slipstream 301 is taken from third coolant 130 downstream of the second refrigeration unit 134 and is used to cool fourth coolant 106 in the third refrigeration unit 110. The subsequently warmed first slipstream 302 is then removed from the third refrigeration unit and re-combined with the third coolant upstream of the third coolant inlet into the second refrigeration unit 134. Likewise, a second slipstream 303 is taken from second coolant 122 downstream of the first refrigeration unit 126 and is used to cool third coolant 130 in the second refrigeration unit 134. The subsequently warmed second slipstream 304 is then removed from the second refrigeration unit and re-combined with the second coolant upstream of the second coolant inlet into the first refrigeration unit 126.

As described herein, for example in the processes described herein and shown in FIGS. 1-3, use of multiple solid-tolerant heat exchangers, operating at different temperatures, may be beneficial for separating various contaminants (e.g., water, $CO_2$, hydrogen sulfide ($H_2S$)) from each other. This also allows optimization of the construction of the equipment. For example, the metallurgy of each heat exchanger may be optimized to address strength at the operating temperatures and modes of corrosion. As a non-limiting example, a heat exchanger designed to primarily precipitate and freeze-out water may be constructed from stainless steel SS316, which is very corrosion resistant, whereas a heat exchanger which will primarily precipitate and freeze-out $CO_2$ may be constructed from stainless steel SS304, which is more fracture resistant at cryogenic temperatures, although not quite as corrosion resistant as SS316 if exposed to liquid water.

Although methods have been disclosed above for using solid-tolerant heat exchangers to remove solid forming species from gas feeds, methods integrating the refrigeration process with the solid-tolerant heat exchangers are less described, especially as applied to the generating of LNG or capturing of $CO_2$ from flue gas.

According to disclosed aspects, a refrigerant flow may be split into two parallel streams. One stream is used to pre-cool the refrigerant prior to expanding (i.e., self-refrigeration) in a recuperative heat exchanger. The second stream is used as the heat sink for the process flow in a solid-tolerant heat exchanger. This approach directly solves the problem of incorporating a solid-tolerant heat exchanger. Typical cryogenic cooling cycles, especially for LNG generation, employ multi-stream heat exchangers where more than two streams are brought into thermal contact for heat transfer to maximize process efficiency. This is in contrast to typical two-stream heat exchangers used in the vast majority of heat transfer applications. Indeed, solid tolerant heat exchangers are only available for two-stream configurations and, therefore, cannot be directly implemented in traditional cryogenic cooling cycles.

Figure 4:
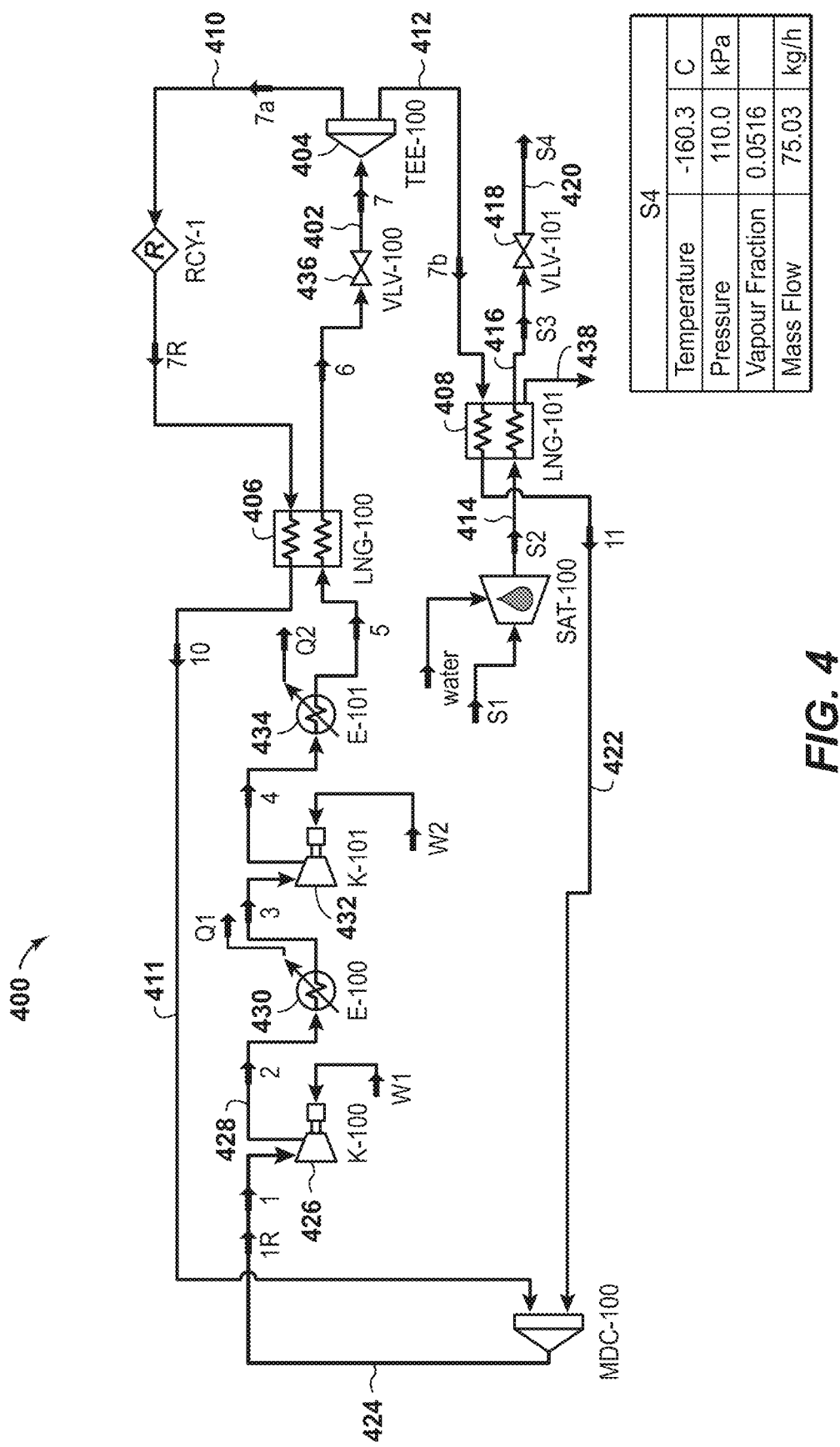
FIG. 4 is a schematic diagram of a process according to still another aspect of the disclosure.

The split refrigerant approach enables a relatively efficient process despite the limitations of two-stream solid-tolerant heat exchangers. This directly permits adoption of solid-tolerant heat exchangers in cryogenic cooling processes for LNG and $CO_2$ capture. FIG. 4 schematically illustrates a modified Poly Refrigerated Integrated Cycle Operation (PRICO) system 400 for LNG production. The traditional PRICO cycle combines a first heat exchanger and a second heat exchanger with a single cold refrigerant stream. As such, the combined heat exchanger is both a recuperative heat exchanger (precooling of the warmer refrigerant stream) and a process cooling heat exchanger (for the process stream). According to disclosed aspects, system 400 modifies and adapts the traditional PRICO cycle for solid-tolerant heat exchanger use by splitting the refrigerant stream 402 using a splitter 404. Splitting the refrigerant stream 402 separates the function of the combined heat exchanger so that a recuperative heat exchanger 406 and a process cooling heat exchanger 408 can be provided separately. Thus, solid-tolerant heat exchanger technology can be readily integrated into a cryogenic cycle, such as the PRICO cycle, for LNG production. Specifically, the refrigerant stream 402 is split by splitter 404 into a first refrigerant stream 410 and a second refrigerant stream 412. The first refrigerant stream 410 passes through the recuperative heat exchanger 406, which may be a non-solid tolerant heat exchanger, and is warmed therein to produce a warmed first refrigerant stream 411. The second refrigerant stream 412 passes through the process cooling heat exchanger 408, in which it cools or chills a process stream 414 and freeze-out solid forming species, such as $CO_2$ or water. These solids may be rejected as stream 438, and may be further processed as desired. The process stream may be a natural gas stream or other type of gas stream. The cooled process stream 416 may be subject to further processing, such as with an expander element 418, to liquefy or further cool the cooled process stream and produce an LNG stream 420. This expansion cooling may generate further amounts of solids. The process cooling heat exchanger is a solid-tolerant heat exchanger, such as a scraped heat exchanger as previously discussed. The warmed second refrigerant stream 422 is combined with the warmed first refrigerant stream 411, and the combined warmed refrigerant stream 424 is compressed in a first compressor 426. The compressed refrigerant stream 428 is cooled in a first cooler 430. The first cooler 430 preferably uses an ambient cool fluid, such as air or water taken from or in thermal contact with an ambient source, to cool the compressed refrigerant stream. The compressed refrigerant stream may be further compressed and cooled in a second compressor 432 and a second cooler 434, respectively. After the refrigerant stream has been sufficiently compressed and cooled, it passes through the recuperative heat exchanger 406, which it is cooled by the first refrigerant stream 410 and expanded in an expander 436 to reduce its temperature prior to repeating the refrigeration circuit.

Figure 5:
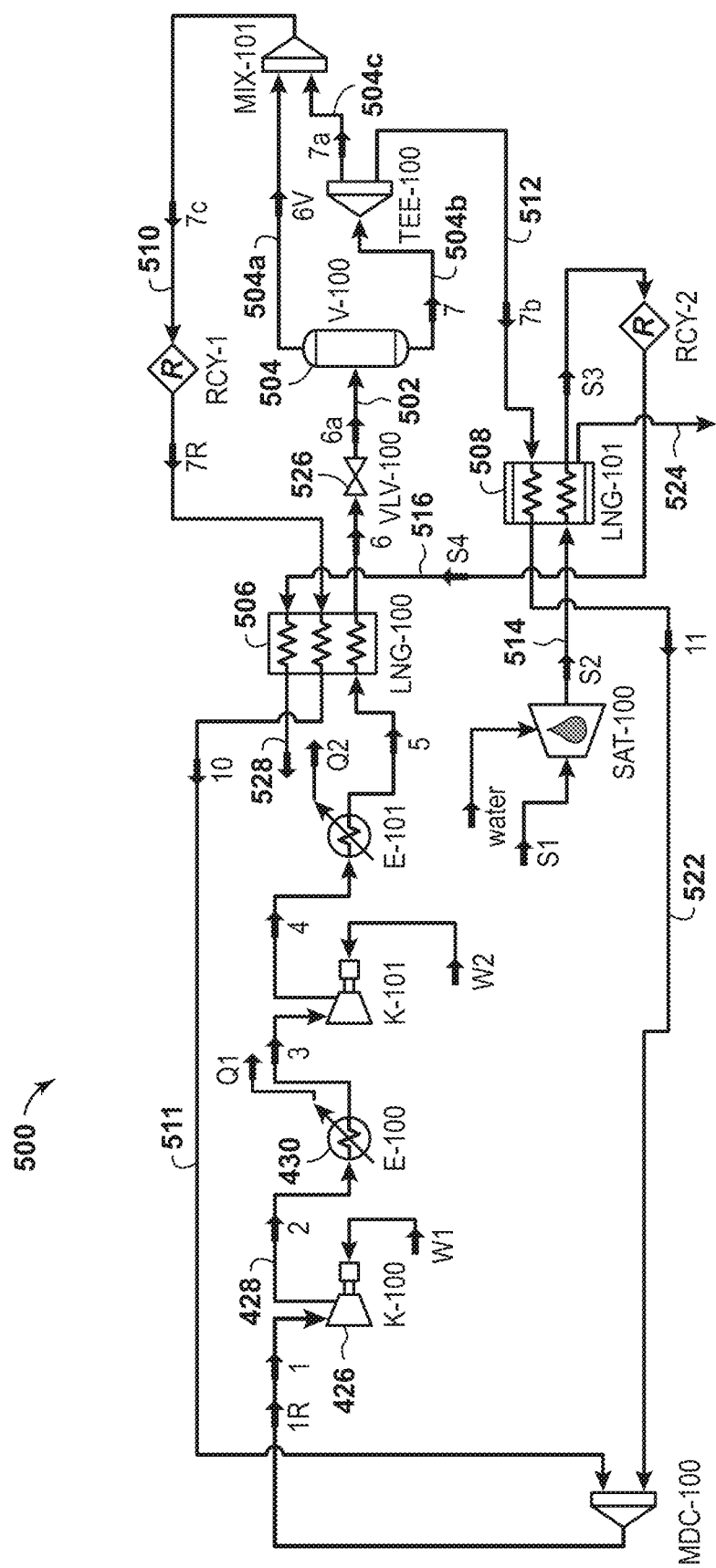
FIG. 5 is a schematic diagram of a process according to yet another of the disclosure.

FIG. 5 schematically illustrates a modified Poly Refrigerated Integrated Cycle Operation (PRICO) system 500 adapted for cryogenic carbon dioxide capture. Elements having common function with similar elements to system 400 may be identified with similar reference numbers and may not be further described. System 500 uses a multi-stream recuperative heat exchanger where both the decarbonized flue gas stream as well as one of the refrigerant split streams are used as heat sinks to precool the refrigerant prior to expansion. Specifically, a refrigerant stream 502 is separated in a separation vessel 504 into first and second portions 504a, 504b. Streams 504a and 504b may reflect single-phase vapor streams and liquid streams respectively. Although not necessary, use of single-phase feeds (as opposed to multi-phase feeds) into heat exchangers can simplify design and help ensure against maldistribution issues. Second portion 504b is split into an intermediate stream 504c and a second refrigerant stream 512. The first portion 504a is combined with the intermediate stream 504c to form a first refrigerant stream 510. The first refrigerant stream 510 passes through a multi-stream recuperative heat exchanger 506, which may be a non-solid tolerant heat exchanger, and is warmed therein to produce a warmed first refrigerant stream 511. The second refrigerant stream 512 passes through a process cooling heat exchanger 508, in which it cools or chills a process stream 514 to produce a cooled process stream 516. During the cooling or chilling process in the process cooling heat exchanger, carbon dioxide and/or other contaminants in the process stream solidify and are thereby separated from the process stream. The solids stream is shown as stream 524. The solid contaminants are removed from the process cooling heat exchanger. The process stream may be a flue gas stream or other type of gas stream. The cooled process stream 516, which has now been depleted of solid forming components, may then be directed to the recuperative heat exchanger 506. The process cooling heat exchanger 508 is a solid-tolerant heat exchanger, such as a scraped heat exchanger as previously discussed. The warmed second refrigerant stream 522 is combined with the warmed first refrigerant stream 511, and the combined warmed refrigerant stream is compressed and cooled, as described with respect to system 400. The refrigerant stream then passes through the recuperative heat exchanger 506, which it is cooled by the first refrigerant stream 510 and by the cooled process stream 516, and then expanded in an expander 526 to reduce its temperature prior to repeating the refrigeration circuit. After exiting the recuperative heat exchanger 506, the warmed process stream 528 may, if flue gas, be exhausted to the atmosphere now that is depleted in $CO_2$. The rejected solids in stream 524 may be purified, converted to liquid or gas, and/or be sold, stored, re-injected into a geologic formation, or the like.

In some embodiments, prior to entering heat exchanger 508, process stream 514 may be precooled to temperature close to but above 0° C. This enables moisture removal through liquid water condensation and reduction of the freeze-out load in heat exchanger 508.

The aspects disclosed in FIGS. 4 and 5 may be used to actively control the split ratio between refrigerant streams, e.g., between first and second refrigerant streams 410, 412 (FIG. 4) or between intermediate stream 504c and second refrigerant stream 512 (FIG. 5). This can be accomplished by incorporating actively controlled valves in these streams. Control of the split ratio may be performed to adjust the temperature of refrigerant stream 402 or 502, which in turn impacts the amount of solids frozen-out in heat exchanger 408 or 508.

The effectiveness of the disclosed aspects may be improved by recirculating process streams through the solid-tolerant heat exchanger. With reference to FIG. 4, this configuration may include a pump that receives a fraction of LNG stream 420 to feed it back to an inlet of the process cooling heat exchanger 408. This increases the amount of liquid present in the heat exchanger with the intention to facilitate solid removal. Many solid tolerant heat exchangers can demonstrate effective solid removal with a liquid process fluid stream to help wash away solids and better entrain solids in a flowing slurry. As the proposed process stream is primarily gaseous, an increase in liquid fraction may increase solid removal effectiveness for a particular solid-tolerant heat exchanger.

Similarly, the recirculation of decarbonized gas can be recirculated to achieve high gas velocities in the solid-tolerant heat exchanger. This facilitates removal of solids formed on the heat exchanger wall by inducing shear stress through high gas velocities. That is, high gas velocities can help blow solids off the heat exchanger walls and entrain the removed solids in the gas flow. In some embodiments the solids may have been partially or fully dislodged from the walls via scrapers. In this particular configuration, recirculation is recommended to be controlled in a cyclical pattern. That is, high velocity gas recirculation is induced periodically based on the rate of solid accumulation and the effectiveness of solid removal. A pulsing recirculation pattern may be employed. Intermittent recirculation is preferred over continuous recirculation to minimize cooling requirements due to dilution of $CO_2$ concentration in the gas stream.

Similarly, the entire process fluid stream, i.e., the full feed gas stream (LNG) and the full flue gas stream (carbon capture) may be pulsed to facilitate solid removal from the heat exchanger surface through intermittently inducing high shear stresses at the solid/process fluid interface. However, the overall process must be able to accommodate this approach with respect to stability.

While the disclosed aspects in FIGS. 4 and 5 may be suitable for many target applications, other cycle configuration may be considered for these applications. Cycles such as dual mixed refrigerant cycles, gas expander cycles as well as other single mixed refrigerant cycles may be modified, adapted and optimized for the effective integration of solid tolerant heat exchangers.

Disclosed aspects may be used in hydrocarbon management activities. As used herein, "hydrocarbon management" or "managing hydrocarbons" includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities. The term "hydrocarbon management" is also used for the injection or storage of hydrocarbons or $CO_2$, for example the sequestration of $CO_2$, such as reservoir evaluation, development planning, and reservoir management. The disclosed methodologies and techniques may be used to produce hydrocarbons in a feed stream extracted from, for example, a subsurface region. Hydrocarbon extraction may be conducted to remove the feed stream from for example, the subsurface region, which may be accomplished by drilling a well using oil well drilling equipment. The equipment and techniques used to drill a well and/or extract the hydrocarbons are well known by those skilled in the relevant art. Other hydrocarbon extraction activities and, more generally, other hydrocarbon management activities, may be performed according to known principles.

As used herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numeral ranges provided. Accordingly, these terms should be interpreted as indicating that insubstantial or inconsequential modifications or alterations of the subject matter described are considered to be within the scope of the disclosure.

The articles "the", "a" and "an" are not necessarily limited to mean only one, but rather are inclusive and open ended so as to include, optionally, multiple such elements.

It should be understood that numerous changes, modifications, and alternatives to the preceding disclosure can be made without departing from the scope of the disclosure. The preceding description, therefore, is not meant to limit the scope of the disclosure. Rather, the scope of the disclo-

What is claimed is:

1. A method of removing solid-forming components from a gaseous process stream, the method comprising:
    compressing a refrigerant stream;
    cooling the refrigerant stream by heat exchange with an ambient cool fluid;
    passing the refrigerant stream through a non-solid-tolerant heat exchanger;
    expanding the refrigerant stream, thereby causing it to cool;
    separating the refrigerant stream into a first refrigerant stream and second refrigerant stream;
    passing the first refrigerant stream through the non-solid-tolerant heat exchanger to cool the refrigerant stream;
    passing the second refrigerant stream through a solid-tolerant heat exchanger;
    forming a cooled treated stream by passing a process stream through the solid-tolerant heat exchanger to be cooled by the second refrigerant stream, wherein the cooling is sufficient to cause solid-forming components in the process stream to solidify;
    separating the solidified solid-forming components from the process stream; and
    recombining the first and second refrigerant streams to form the refrigerant stream.

2. The method of claim 1, wherein the solid-tolerant heat exchanger is a scraped heat exchanger.

3. The method of claim 2, wherein the cooled treated stream comprises liquefied natural gas (LNG), the method further comprising:
    recycling and adding a portion of the LNG to the process stream upstream of the scraped heat exchanger to help wash solidified solid-forming components out of the scraped heat exchanger.

4. The method of claim 1, wherein the process stream comprises natural gas, and wherein the cooled treated stream comprises liquefied natural gas (LNG).

5. The method of claim 4, wherein the cooled treated stream is expanded to ambient pressure to form a treated vapor stream and liquid treated stream.

6. The method of claim 5, wherein the compressing step is performed by a compressor, and further comprising:
    using the treated vapor stream as a fuel to drive the compressor.

7. The method of claim 4, further comprising:
    orienting the solid-tolerant heat exchanger vertically;
    completely filling the solid tolerant heat exchanger with recirculating liquid; and
    bubbling the process stream into the recirculating liquid such that the process stream flows countercurrent to a flow of the recirculating liquid.

8. The method of claim 1, wherein the process stream is flue gas from a combustion process, and wherein the cooled treated stream is passed through the non-solid-tolerant heat exchanger to cool the refrigerant stream.

9. The method of claim 1, wherein the process stream is flue gas from a combustion process, and wherein the gas stream is recirculated through the solid tolerant heat exchanger with a blower, fan or air-pump to facilitate solid removal via high gas velocities and high shear stress.

10. The method of claim 9, wherein the gas stream recirculation is intermittent and/or pulsing with high velocity.

11. The method of claim 1, wherein the solid forming components comprise one of carbon dioxide and water.

12. The method of claim 1, further comprising:
    transferring the separated solidified solid-forming components to a heating unit to at least partially melt or vaporize the solid-forming components at a pressure greater than ambient pressure.

13. The method of claim 12, wherein the heating unit is a first heating unit, the method further comprising:
    alternatingly isolating the first heating unit and a second heating unit from the solid-tolerant heat exchanger, the first and second heating units being operated to remove solids from the process stream in an alternating pattern to allow continuous solid removal from the process stream.

14. The method of claim 12, wherein the transferring step is accomplished using an auger, disposed in the heating unit, the auger configured to simultaneously compact and transport the solidified solid-forming components out of the heating unit such that a vapor leakage into or out of the heating unit is minimized.

15. The method of claim 1, wherein the refrigerant stream comprises a single mixed refrigerant.

16. The method of claim 1, wherein the flow through the solid-tolerant heat exchanger is intermittent or semi-continuous to extend residence time and to allow more complete cooling of the process stream and freezing of the solid forming components.

17. The method of claim 1, further comprising:
    upstream of the solid-tolerant heat exchanger, pre-cooling the process stream to a temperature above 0° C. to precipitate water therefrom; and
    separating the precipitated water from the process stream.

18. The method of claim 1, where the second refrigerant stream is in a completely liquid state at an inlet of the solid-tolerant heat exchanger.

19. The method of claim 1, where a total mass flow of the first refrigerant stream is at least twice a total mass flow of the second refrigerant stream.

20. The method of claim 1, further comprising:
    actively controlling a split fraction of the first refrigerant stream and the second refrigerant stream to achieve a desired cooling of the expanded refrigerant stream.

* * * * *